United States Patent [19]

Harpell et al.

[11] Patent Number: 4,820,568
[45] Date of Patent: Apr. 11, 1989

[54] COMPOSITE AND ARTICLE USING SHORT LENGTH FIBERS

[75] Inventors: G.A. Harpell, Morris Township, Morris County; H. L. Li, Parsippany; Y. D. Kwon, Mendham; D. C. Prevorsek, Morris Township, Morris County, all of N.J.

[73] Assignee: Allied-Signal Inc., Morris Township, Morris County, N.J.

[21] Appl. No.: 81,260

[22] Filed: Aug. 3, 1987

[51] Int. Cl.[4] ............................................. B32B 5/12
[52] U.S. Cl. ................................... 428/113; 428/189; 428/232; 428/246; 428/284; 428/286; 428/293; 428/294; 428/297; 428/298; 428/302; 428/902; 428/911
[58] Field of Search ............... 428/284, 232, 295, 297, 428/298, 302, 911, 243, 294, 113, 189, 246, 902, 226

[56] References Cited

U.S. PATENT DOCUMENTS

| | | | |
|---|---|---|---|
| 4,403,012 | 9/1983 | Harpell et al. | 428/290 |
| 4,457,985 | 7/1984 | Harpell et al. | 428/224 |
| 4,501,856 | 2/1985 | Harpell et al. | 525/240 |
| 4,543,286 | 9/1985 | Harpell et al. | 428/288 |
| 4,584,347 | 4/1986 | Harpell et al. | 525/119 |
| 4,613,535 | 9/1986 | Harpell et al. | 428/113 |
| 4,623,574 | 11/1986 | Harpell et al. | 428/113 |
| 4,650,710 | 3/1987 | Harpell et al. | 428/263 |
| 4,663,101 | 5/1987 | Kavesh et al. | 264/178 |
| 4,681,792 | 7/1987 | Harpell et al. | 428/102 |
| 4,737,401 | 4/1988 | Harpell et al. | 428/252 |
| 4,737,402 | 4/1988 | Harpell et al. | 428/252 |

OTHER PUBLICATIONS

John V. E. Hansen and Roy C. Liable, Flexible Body Armor Materials, Fiber Frontiers ACS Conference, Jun. 10-12, 1974.
NTIS publication ADA018 958, New Materials in Construction for Improved Helmets, A. L. Alesi, et al., vol. 8, No. 1, pp. 8-15 (Feb. 1987).
Alesi, Aramid Fiber-Reinforced Ionomer, Polymer Engineering and Science, vol. 18, No. 16, pp. 1209-1215 (Dec. 1978).
Roylance, et al., Ballistic Impact of Textile Structures, Textile Research Journal, pp. 34-41, (Jan. 1973).
Roylance, Influence to Fibre Properties on Ballistic Penetration of Textile Panels, Fibre Science & Technology, vol. 14, pp. 183-190 (1981).
Liable, Ballistic Materials and Penetration Mechanics, Elserier Scientific Publishing Co., Chap. 4 (1980).
Roy C. Liable, et al., J. Macromel, Sci. Chem., A7 (1), pp. 295-322, 1973.

Primary Examiner—James J. Bell
Attorney, Agent, or Firm—Richard A. Negin; Gerhard H. Fuchs

[57] ABSTRACT

The present invention is an improved prepreg layer, multilayer composite based on the improved prepreg layer, and article made from the multilayer composite.

The prepreg layer of the present invention comprises an array of at least two adjacent, coplanar fibrous elements. Each element comprises a plurality of unidirectional coplanar fibers embedded in a polymeric matrix. The fibers are up to eight inches, preferably one to eight inches, and more preferably two to six inches long.

The prepreg layer of the present invention is useful to make a multilayer composite comprising a plurality of the prepreg layers as recited above. The fibers of adjacent layers are at an angle of about 90° from each other. The composite preferably has 2 to 500, more preferably 10 to 150, and most preferably 60 to 120 layers.

24 Claims, 3 Drawing Sheets

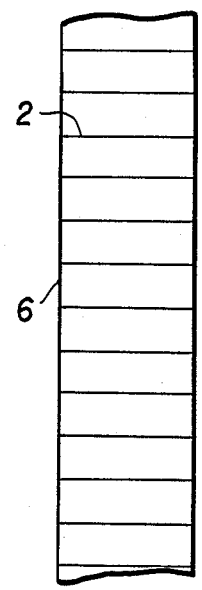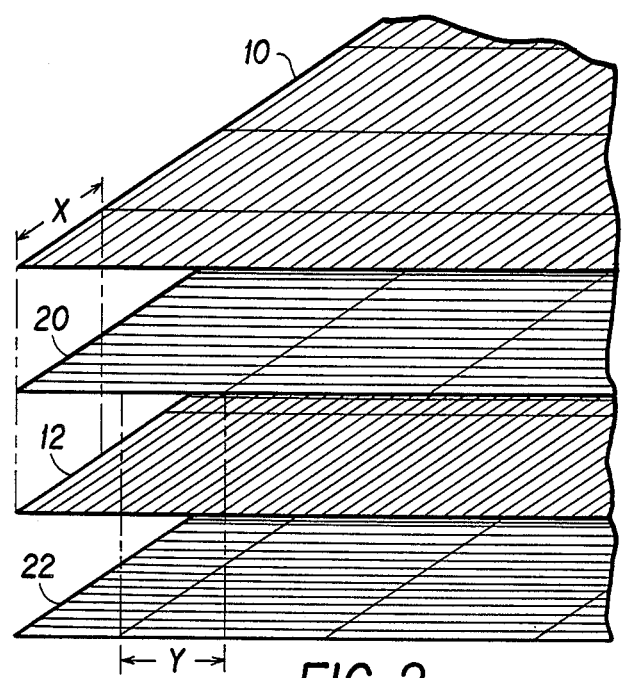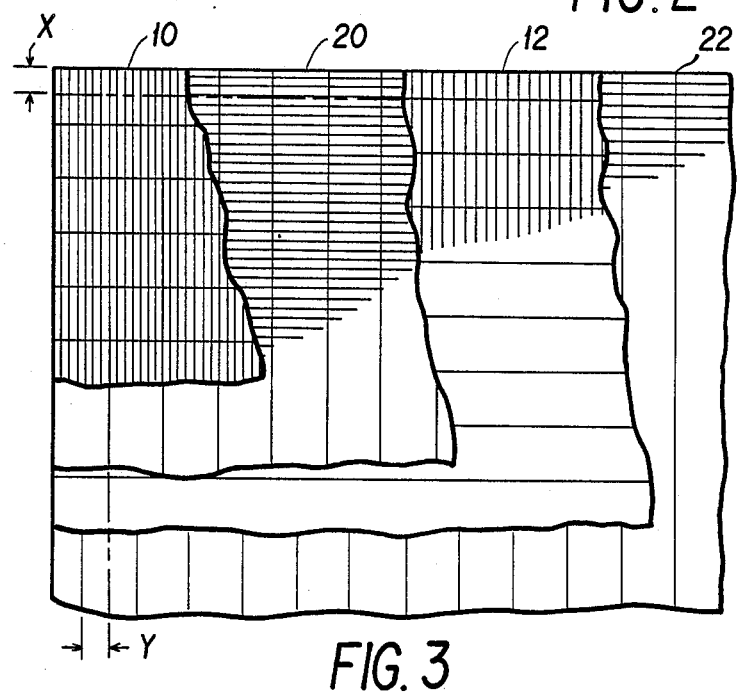

COMPOSITE AND ARTICLE USING SHORT LENGTH FIBERS

BACKGROUND OF THE INVENTION

Fiber arrays impregnated with various polymers are well known. Typically, these take the form of short randomly distributed fibers or long continuous fibers either in mat, weave or knit form or in continuous form where adjacent fibers are parallel and generally continuous through the fabric. For the purpose of the present invention one or more fibrous layers made from fiber impregnated with a polymeric matrix and useful to form articles is known as a "prepreg". Forms of prepregs include impregnated woven fabric, felt mats, as well as unidirectional fiber web.

The use of high strength and cut resistance fibers have made such prepregs useful to make articles which are resistant to cutting and high speed impact from projectiles such as BB's, bullets, shells, shrapnel, glass fragments, and the like.

Fibers conventionally used include aramid fibers, fibers such as poly(phenylenediamine terephthalamide), graphite fibers, ceramic fibers, nylon fibers, glass fibers and the like. For these applications, the fibers are ordinarily encapsulated or embedded in a rigid matrix material and, in some instances, are joined with rigid facing layers to form complex composite structures.

Ballistic articles such as bulletproof vests, helmets, armor plate, and other military equipment, structural members of helicopters, aircraft, ships, and vehicle panels and briefcases containing high strength fibers are known.

U.S. Pat. No. 4,403,012 and U.S. Pat. No. 4,457,985 disclose ballistic-resistant composite articles comprised of networks of ultra-high molecular weight polyethylene or polypropylene fibers in matrices composed of olefin polymers and copolymers, unsaturated polyester resins, epoxy resins and other resins curable below the melting point of the fiber.

Particular reference is made to U.S. Pat. No. 4,457,985 at Col. 3, beginning at line 53 where it is disclosed that ballistic resistant articles can contain fibers formed as a felt, basket woven or formed into fabric in any of a variety of conventional techniques. Reference is made to techniques such as those described in U.S. Pat. No. 4,181,768 and M. R. Silyquist, et al., J. Macromol. Sci. Cheme., A7 (1) 203 et seq (1973).

Reference is made to ballistic resistance composite articles disclosed in U.S. Pat. Nos. 4,457,985; 4,501,856; 4,613,535 4,623,574; and 4,650,710. These patents consistently teach forming prepregs and composite structures in the manner reviewed above with regard to U.S. Pat. No. 4,457,985.

U.S. Pat. No. 4,309,487 discloses ballistic resistant laminates of polyethylene fibers where the film or fibers in each layer are unidirectionally oriented and at an angle to fibers in adjacent layers. The laminates are made in the absence of adhesive with each layer being at least 0.5 mils thick. A six inch by six inch square film laminate is disclosed in the Examples. Also, of interest is U.S. Pat. No. 4,079,161.

The teachings of theese patents are consistent with the general teaching of the art that articles made of composites having ballistic resistance should be based upon fiber having continuous length in the article. This is supported by teaching such as Williams, et al., The Impact Strength Of Fibre Composites, Journal Of Materials Science, Vol. 8, p. 1765-1787 (1973); and Silverman, Effect Of Glass Fibre Length On The Creep and Impact Resistance Of Reinforced Thermoplastics, Polymer Composites, Vol. 8, No. 1 pp. 8-15 (February, 1987).

Alesi, Aramid Fiber-Reinforced Ionemer, Polymer Engineering and Science, Vol. 18, No. 16, pp. 1209-1215 (December, 1978) discloses the use of chopped aramid fiber having a length of from one quarter to one-half inch for use in compression and injection molding. Ballistic performance of these composites was very poor.

Roylance, et al., Ballistic Impact Of Textile Structures, Textile Research Journal, pp. 34-41 (January 1973) discloses fiber behavior during ballistic impact. Reference is also made to Roylance, Influence to Fibre Properties on Ballistic Penetration of Textile Panels, Fibre Science and Technology, Vol. 14, pp. 183-190 (1981). There is a review of ballistic penetration resistance of textile panels. These references suggest that fabrics made from continuous fibers would be consistent with their goals of improved ballistic composite properties.

Finally reference is made to Laible, Ballistic Materials and Penetration Mechanics, Elsevier Scientific Publishing Company (1980). This text consistent with the other art indicates the desirability of continuous length fiber for use to attain ballistic resistance.

SUMMARY OF THE INVENTION

The present invention is an improved prepreg layer, multilayer composite based on the improved prepreg layer, and article made from the multilayer composite.

The prepreg layer of the present invention comprises an array of at least two adjacent, coplanar fibrous elements. Each element comprises a plurality of unidirectional coplanar fibers embedded in a polymeric matrix. The fibers are up to eight inches, preferably from one to eight inches, and more preferably two to six inches long. The adjacent elements are connected by the polymer matrix.

The prepreg layer of the present invention is useful to make a multilayer composite comprising a plurality of the prepreg layers as recited above. The fibers of adjacent layers are at an angle of about 90° from each other. The angle of fiber in alternate layers is preferably substantially the same. The composite preferably has 2 to 500, more preferably 10 to 125, and most preferably 60 to 120 layers. The boundaries of the interconnected elements within each prepreg layer can be offset from boundaries in alternate layers.

The present invention includes fabric containing fibers up to eight inches long, preferably 1 to eight inches, more preferably 2 to 8 inches, and most preferably 2 to 6 inches. The fabric can be woven so that the fibers are at angles consistent with the above requirements.

An article can be made from the multilayer composite of the present invention. The article can be planar or formed into three dimensions such as helmets and other three dimensional articles.

The prepreg layer, and multilayer composite made using the prepreg layer result in articles that are resistant to high speed impact such as encountered by bullets, shell fragments and the like. The fibers are therefore preferably made of a relatively high strength material having a tensile modulus of at least about 160 grams/denier and preferably at least 500 grams/denier and the tenacity of at least about 7 grams/denier and preferably at least 22 grams/denier. The matrix can be any polymeric matrix and is preferably an elastomeric matrix.

BRIEF DESCRIPTION OF THE DRAWINGS

FIG. 1 is a schematic drawing, not to scale, of a strip element for a prepreg layer of the present invention.

FIG. 2 is an exploded view showing four layers of a multilayer composite of the present invention.

FIG. 3 is a top view of four layers of a multilayer composite of the present invention showing the position of the strip elements as presented in FIG. 1.

DETAILED DESCRIPTION OF THE INVENTION

Figure 4:
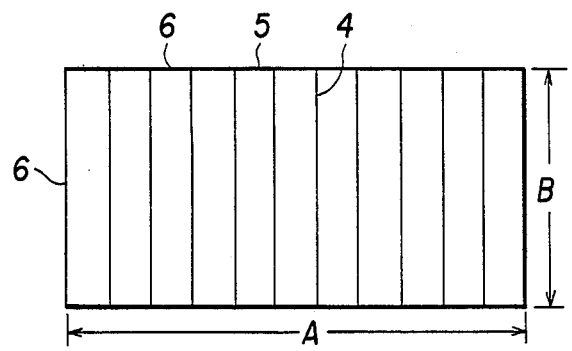
FIG. 4 is an alternate embodiment of the present invention showing a fibrous element useful in making the prepreg layer.

The present invention is directed to a prepreg layer comprising an array of at least two adjacent coplanar, fibrous elements. Each element comprises a plurality of unidirectional fibers embedded in a polymer matrix. The fibers in each element are up to eight inches long, preferably from 1 to 8, and more preferably 2 to 6 inches long. The adjacent coplanar elements are connected through a polymer matrix.

The present invention also includes a multilayer composite comprising a plurality of the prepreg layers. The fibers of adjacent layers are at an angle of about 90° from each other. The element boundaries of alternate layers are preferably offset from each other. This results in an avoidance of weakness at the boundary points. The multilayer composites contain at least 2 layers, preferably from 2 to 500, more preferably 10 to 150, and most preferably 60 to 120 prepreg layers. The composite is useful to form planar and three dimensional formed articles. A particularly useful article made from the present invention is a ballistic resistant helmet.

The composite articles of the present invention have improved impact resistance. The composite articles preferably comprise high strength fibers having a tensile modulus of at least about 160 grams/denier and preferably at least about 500 grams/denier and a tenacity of at least about 7 grams/denier and preferably at least 22 grams/denier in a polymer matrix which is preferably an elastomeric matrix having a tensile modulus of less than about 20,000 psi, (measured at according to ASTM D638-84 at 25° C.).

For the purposes of the present invention, fiber is an elongated body, the length dimension of which is much greater than the transverse dimensions of width and thickness, Accordingly, the term fiber includes monofilament fiber, multifilament fiber, ribbon, strip, a plurality of any one of combinations thereof and the like having regular or irregular cross-section.

Depending on the application for use of the prepreg layer in the multilayer composite of the present invention different fibers and different matrices can be used. Useful fibers include polyolefin based polymers and particularly ultra high molecular weight polyolefin fibers including polyethylene and polypropylene fibers. Other useful high strength fibers include aramid fibers, polyvinyl alcohol fibers and other high strength fibers. Also useful in the present invention are a variety of conventional fibers which would result in improvement in resistance to impact properties when used in accordance with the present invention. Such fibers include but are not limited to asbestos, carbon, graphite, boron, cellulose, alumina, and metal fibers.

Fiber useful in the present invention include hightly oriented ultra-high molecular weight polyethylene fiber, highly oriented ultra-high molecular weight polypropylene fiber, aramid fiber, polyvinyl alcohol fiber or combinations thereof. U.S. Pat. No. 4,457,985 generally discusses such oriented ultra high molecular weight polyethylene and polypropylene fibers, and disclosure of which is hereby incorporated by reference to the extent not inconsistent herewith. In the case of polyethylene, suitable fibers are those highly oriented fibers of weight average molecular weight of at least about 200,000, preferably at least 500,000 preferably at least about one million and more preferably between about two million and about five million. Known as extended chain polyethylene (ECPE) fibers, such fibers may be produced from polyethylene solution spinning processes described for example, in U.S. Pat. No. 4,137,934 to Meihuzen et al. or U.S. Pat. No. 4,356,138 to Kavesh et al., or spun from a solution to form a gel structure as described in German Off. No. 3,044,699, GB No. 2051667, and especially as described in U.S. Pat. No. 4,413,110.

As used herein, the term polyethylene shall mean a predominantly linear polyethylene material that may contain minor amounts of chain branching or comonomers not exceeding 5 modifying units per 100 main chain carbon atoms and that may also contain admixed therewith up to about 25 wt% of one or more polymeric additives such as alkene-1-polymers, in particular low density polyethylene, polypropylene or polybutylene, copolymers containing mono-olefins as primary monomers, oxidized polyolfins, graft polyolefin copolymers and polyoxymethylenes, or low molecular weight additives such as anti-oxidants, lubricants, ultra-violet screening agents, colorants and the like which are commonly incorporated therewith. Depending upon the fiber forming technique, the draw ratio and temperatures, and other conditions, a variety of properties can be imparted to these fibers. The tenacity of the fibers is ordinarily at least about 15 grans/denier, preferably at least about 25 grams/denier and most preferably at least about 30 grams/denier. Similarly, the tensile modulus of the fibers, as measured by an Instron tensile texting machine, is ordinarily at least about 300 grams/denier, preferably at least about 500 grams/denier, more preferably at least about 1,000 grams/denier and most preferably at least about 1,500 grams/denier. These highest values for tensile modulus and tenacity are generally obtainable only by employing solution spun or gel fiber processes. In addition, many ECPE fibers have melting points higher than the melting point of the polymer from which they were formed. Thus, for example, whereas ultra-high molecular weight polyethylene of 500,000, one million and two million generally have melting points in the bulk of 138° C., the ECPE fibers made of these materials have melting points 7° to 13° C. higher. The increase in melting point reflect a higher crystalline orientation of the fibers as compared to the bulk polymer. Notwithstanding the contrary teachings in the prior art improved ballistic resistant articles are formed when polyethylene fibers having a weight average molecular weight of at least about 200,000, preferably at least about 500,000, a modulus of at least about 500 g/denier and a tenacity of at least about 15 grams/denier are employed. c.f. John V. E. Hansen and Roy C. Liable in "Flexible Body Armor Materials," Fiber Frontiers ACS Conference, June 10–12, 1974 (ballistically resistent high strength fibers must exhibit high melting point and high resistance to cutting or shearing); Roy C. Liable, Ballistic Materials and Penetration Mechanics, 1980 (noting that nylon and polyester may be limited in their ballistic effectiveness due to the lower melting point); and "The Application of High Modulus Fibers to Ballistic Protection", R. C. Liable, et al., J. Macromol, Sci. Chem., A7 (1), pp. 295–322, 1973 (the importance of a high degree of heat resistance is again discussed).

In the case of polypropylene, highly oriented polypropylene fibers of weight average molecular weight at least about 300,000, preferably at least 750,000, more preferably at least about one million and most preferably at least about two million may be used. Ultra high molecular weight polypropylene may be formed into reasonably highly oriented fibers by the techniques prescribed in the various references referred to above, and especially by the technique of U.S. Pat. No. 4,413,110. Since polypropylene is a much less crystalline material than polyethylene and contains pendant methyl groups, tenacity values achievable with polypropylene are generally substantially lower than the corresponding values for polyethylene. Accordingly, a suitable tenacity is at least about 8 grams/denier, with a preferred tenacity being at least about 11 grams/denier. The tensile modulus for polypropylene is at least about 160 grams/denier preferably at least about 200 grams/denier. The melting point of the polypropylene is generally raised several degrees by the orientation process, such that the polypropylene fiber preferably has a main melting point of at least about 168° C., more preferably at least about 170° C. Employing fibers having a weight average molecular weight of at least about 750,000 coupled with the preferred ranges for the above-described parameters (modulus and tenacity) can provide advantageously improved performance in the final article especially in ballistic resistant articles, notwithstanding the contrary teachings in the prior art). c.f. Liable, Ballistic Materials and Penetration Mechanics, supra, at p. 81 (no successful treatment has been developed to bring the ballistic resistance of polypropylene up to levels predicted from the yarn stress-strain properties); and in NTIS publication ADA018 958, "New Materials in Construction for Improved Helmets", A. L. Alesi et al. wherein a multilayer highly oriented polypropylene film material (without matrix), referred to as "XP", was evaluated against an aramid fiber (with a phenolic/polyvinyl butyral resin matrix); the aramid system was judged to have the most promising combination of superior performance and a minimum of problems of combat helmet development.

Aramid fiber is formed principally from the aromatic polyamide. Aromatic polyamide fibers having a modulus of at least about 400 grams/denier and tenacity of at least about 18 grams/denier are useful for incorporation into composites of this invention. For example, poly(-phenylenediamine terphalamide) fibers produced commercially by Dupont Corporation under the trade name of Kevlar ® 29 and 49 and having moderately high moduli and tenacity values are particularly useful in forming ballistic resistant composites. (Kevlar ® 29 has 500 grams/denier and 22 grams/denier and Kevlar ® 49 has 1000 grams/denier and 22 grams/denier as values of modulus and tenacity, respectively).

Polyvinyl alcohol (PV-OH), fibers having a weight average molecular weight of at least about 200,000, preferably at least about 550,000, more preferably between about 1,000,000 and about 4,000,000 and most preferably between about 1,500,000 and about 2,500,000 may be employed in the present invention. Usable fibers should have a modulus of at least about 160 grams/denier, preferably at least about 200 grams/denier, more preferably at least about 300 grams/denier, and a tenacity of at least about 7 grams/denier, preferably at least about 10 grams/denier and most preferably at least 17 grams/denier. PV-OH fibers having a weight average molecular weight of at least about 500,000, a tenacity of at least about 200 grams/denier and a modulus of at least about 10 grams/denier are particularly useful in producing ballistic resistant composites. PV-OH fibers having such properties can be produced, for example, by the process disclosed in U.S. Pat. No. 4,599,267 to Kwon et al.

The fibers may be precoated with a polymeric material preferably an elastomer based material prior to being arranged as described above. The low modulus elastomeric material has a tensile modulus, measured at about 23° C., of less than about 20,000 and preferably less than 6,000 psi (41,400 kPa). Preferably, the tensile modulus of the elastomer is less than about 5,000 psi (34,500 kPa), and most preferably is less than about 2,500 (17,250 kPa) to provide even more improved performance. The glass transition temperature (Tg) of the elastomer (as evidenced by a sudden drop in the ductility and elasticity of the material) should be less than about 0° C. Preferably, the Tg of the elastomer is less than about −40° C., and more preferably is less than about −50° C. The elastomer should have an elongation to break of at least about 50%. Preferably, the elongation to break is at least about 100%, and more preferably, it is about 300% for more superior performance.

A wide variety of elastomeric materials and formulations may be utilized in this invention. Representative examples of suitable elastomers have their structures, properties, and formulations together with crosslinking procedures summarized in the Encyclopedia of Polymer Science, Vol. 5, "Elastomers-Synthetic" (John Wiley & Sons Inc., 1964). The essential requirement is that the matrix materials of this invention have appropriately low moduli as noted above. For example, any of the following materials may be employed: polybutadiene, polyisoprene, natural rubber, ethylene-propylene copolymers, ethylenepropylene-diene terpolymers, polysulfide polymers, polyurethane elastomers, chlorosulfonated polyethylene, polychloroprene, plasticized polyvinylchloride using dioctyl phthalate or other plsticers well known in the art, butadiene acrylonitrile elastomers, poly(isobutylene-co-isoprene), polyacrylates, polyesters, polyethers, fluorelastomers silicone elastomers, thermoplastic elastomers, copolymers of ethylene.

Particularly useful are block copolymers of conjugated dienes and vinyl aromatic monomers. Butadiene and isoprene are preferred conjugated diene elastomers. Styrene, vinyl toluene and t-butyl styrene are preferred conjugated aromatic monomers. Block copolymers incorporating polyisoprene may be hydrogenated to produce thermoplastic elastomers having saturated hydrocarbon elastomer segments. The polymers may be simple tri-block copolymers of the type A-B-A, multi-block copolymers of the type (AB)n(n=2-10) or radial configuration copolymers of the type R-(BA)×(×=-30-150); wherein A is a block from a polyvinyl aromatic monomer and B is a block from a conjugated diene elastomer. Useful polymers are produced commercially by the Shell Chemical Co. and described in the bulletin "Kraton Thermoplastic Rubber", SC-68-81.

The low modulus elastomeric material may be compounded with fillers such as carbon black, silca, glass microballoons, etc. up to an amount not to exceed about 300% by weight of elastomer, preferably not to exceed about 100% by weight and may be extended with oils and vulcanized by sulfur, peroxide, metal oxide or radiation cure systems using methods well known to rubber technologists of ordinary skill. Blends of different elastomeric materials ma be used together or one or more elastomer materials may be blended with one or more thermoplastics. High density, low density, and linear low density polyethylene may be cross-linked to obtain a material of appropriate properties, either alone or as blends. The modulus of such a modified compound refers to the total matrix compound.

The proportion of coating on the coated fibers or fabrics may vary from relatively small amounts (e.g. 1% by weight of fibers) to relatively large amounts (e.g. 150% by weight of fibers), depending upon whether the coating material has impact or ballistic-resistant properties, and upon the rigidity, shape, heat resistance, wear resistance, flammability resistance and other properties desired for the composite article. In general, ballistic-resistant articles of the present invention containing coated fibers should have a relatively minor proportion of coating since the ballistic-resistant properties are almost entirely attributable to the fiber. Nevertheless, coated fibers with higher coating contents may be employed. Useful amounts of coating, based upon the weight of the fiber range from 5 to 100, preferably 10 to 50, and most preferably 10 to 30 percent.

The coating may be applied to the fiber in a variety of ways. One method is to apply the resin of the coating material to the stretched high modulus fibers either as a liquid, a stick solid or particles in suspension, or as a fluidized bed. Alternatively, the coating may be applied as a solution or emulsion in a suitable solvent whih does not adversely affect the properties of the fiber at the temperature of application. While any liquid capable of dissolving or dispersing the coating polymer may be used, preferred groups of solvents include water, paraffin oils, ketones, alcohols, aromatic solvents or hydrocarbon solvents or mixtures thereof, with illustrative specific solvents including paraffin oil, xylene, toluene and octane. The techniques used to dissolve or disperse the coating polymers in the solvents will be those conventionally used for the coating of similar elastomeric materials on a variety of substrates.

Other techniques for applying the coating to the fibers may be used, including coating of the high modulus precursors before the high temperature stretching operation, either before or after removal of the solvent from the fiber. The fiber may then be stretched at elevated temperatures to produce the coated fibers. The extruded gel fiber may be passed through a solution of the appropriate coating polymer (solvent may be paraffin oil, aromatic or aliphatic solvent) under conditions to attain the desired coating. Crystallization of the high molecular weight polyethylene in the gel fiber may or may not have taken place before the fiber passes into the cooling solution. Alternatively, the fiber may be extruded into a fluidized bed of the appropriate polymeric powder.

The fiber used in the present invention, as indicated above can be monofilament fiber, multifilament fiber, ribbons, strip or combinations thereof. The fiber can have regular or irregular cross-section. The fiber can be in the form of a monofilament or multifilament yarn. It can be twisted or untwisted.

The fibers in the fibrous elements used to form the prepreg layers of the present invention are preferably arranged unidirectionally in that each fiber is parallel to an adjacent fiber. The fibrous web is impregnated with a polymeric material to form the prepreg layer. The prepreg layer is cut so that the longest continuous fiber in the layer is from 1 to 8 and preferably 2 to 6 inches in length. Typical embodiments of the cut prepreg layer useful in the present invention are shown in FIGS. 1 and 4. FIG. 1 illustrates a long strip in which the continuous fibers 2 are perpendicular to the length of the strip 6. FIG. 4 illustrates a short element which is preferably square or rectangular having continuous fibers 4 perpendicular to one edge 5 of the element. While these are preferred elements, it is recognized that any shape element containing unidirectionally fibers of from 1 to 8, and preferably 2 to 6 inches can be used.

The prepreg layer of the present invention is made of at least two adjacent coplanar fibrous elements of the type shown in FIGS. 1 and 4. The impregnated fiber elements are laid up and connected at their boundaries. Preferably they are butted together and result in the coplanar prepreg layer of the present invention. The elements are connected through the polymer matrix.

Figure 5:
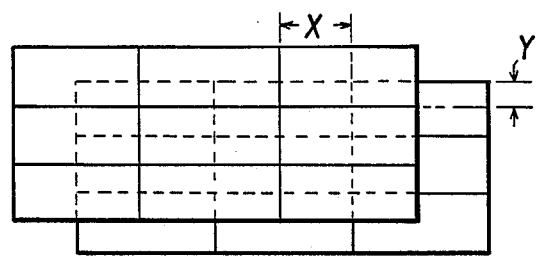
FIG. 5 is a top view of a two layer composite built using the element shown in FIG. 4.

FIGS. 2, 3 and 5 show preferred embodiments using the prepreg layers of the present invention. The prepreg layers made using the elements such as shown in FIGS. 1 and 4 are used to make multilayer composites. Each prepreg layer comprises an array of at least two adjacent coplanar fibrous elements. The fibers of adjacent layers are at an angle of about 90° from the fiber and the adjacent layers. The element boundaries of adjacent layers are offset from each other as shown by X and Y in FIGS. 2, 3 and 5 This prevents weakness should be an impact occur at the boundary of a given layer. The orientation of the fibers of an element within a prepreg layer can vary from element to element as shown in FIG. 5. For example, the fibers in one element can be 90° different from the fibers in an adjacent element within a prepreg layer. When this is the case adjacent layers could have portions of each of given elements having a common angle. It is preferred that a significant part of adjacent elements in the adjacent layers have fibers at angles of about 90° from each other.

Figure 6:
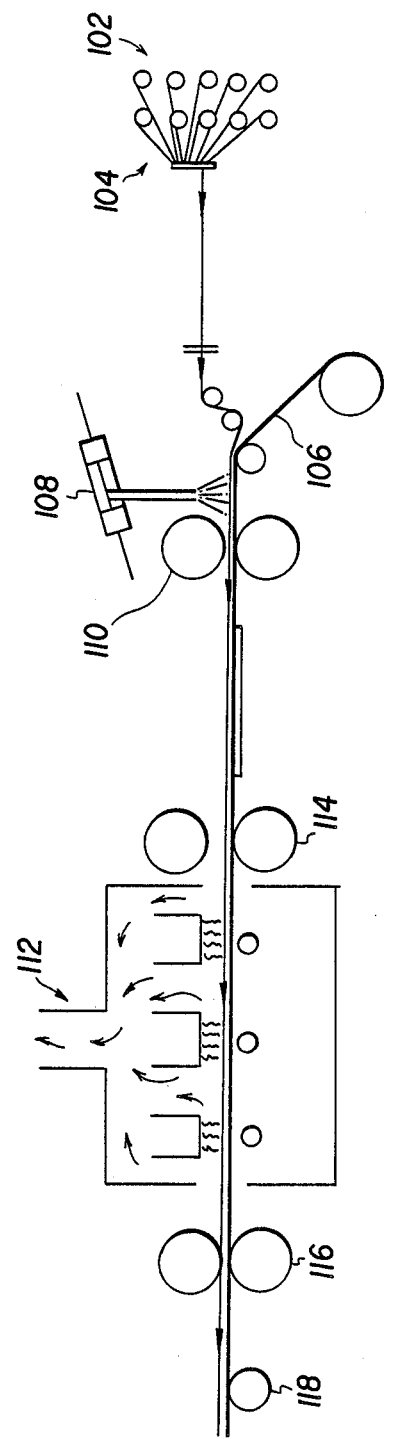
FIG. 6 is a schematic drawing of a layout used to make elements for prepregs of the present invention.

FIG. 6 illustrates a schematic view of a process to make the elements useful for prepreg layers of the present invention. This typical process illustrates forming the prepreg from multifilament yarn and impregnating these fibers with matrix resin. The process generally comprises the steps of bringing the yarn in sheet form onto a carrier web and bringing the yarn laid in the unidirectional sheet form into contact with the matrix resin. The matrix resin can be in the form of solution, emulsion or melt. The next step is to consolidate the resin impregnated sheet. This can be accomplished by drying to remove the solvent or cooling to solidify the melt. The prepreg sheet is then rewound and cut for use in accordance with the present invention.

A useful process is illustrated in FIG. 6. A plurality of yarn is supplied from a creels 102 and passed through a combing stations 104. The combed yarn is then placed on a carrier web which can be a paper or film substrate 106. A polymer resin is applied to the yarn layer at 108. The coated yarn is then passed through a pair of rollers 110. The rollers spread the resin uniformly among the filaments of yarn. The impregnated yarn layer is then passed through a heated oven 112 for drying. Nip roller 114 is used to control final layer thickness. Nip roller 116 is used to pull the carrier web and prepreg through the system. The substrate and the prepreg are wound on roller 118. The prepreg sheet can then be cut into suitable elements to make the prepreg layers of the present invention.

Suitable matrix materials include polyethylenes, cross-linked polyethylenes, polypropylenes, ethylene copolymers, propylene copolymers and other olefin polymers and copolymers. Examples of such other matrix materials include unsaturated polyesters, phenolics, polybutyrals, epoxy resins and polyurethane resins and other low modulus resins curable below the melting point of the fiber.

The proportion of matrix to fiber is variable for the composites, with matrix material amounts of from about 5% to about 150%, by weight of fibers, representing the broad general range. Within this range, it is preferred to use composites having a relatively high fiber content, such as composites having only 10–50% matrix material, by weight of fibers, and more preferably 10–30% matrix material.

Stated another way, the fiber network occupies different proportions of the total volume of the composite. Preferably, however, the fiber network comprises at least about 30 volume percent of the composite. For ballistic protection, the fiber network comprises at least about 50 volume percent, and most preferably at least about 70 volume percent, with the matrix occupying the remaining volume.

Composites made using the prepreg layer are made using the above-described fibrous elements. A preferred way to make the prepregs is to lay-up individual layers and heat them and form them into the desired configuration. Suitable means include compression molding, stamping, or heating under pressure within an autoclave.

One technique for forming a composite includes the steps of arranging prepreg sheet into a desired element structure. The prepreg layers are then made into a composite by laying up the prepreg layers. The composite is then heated under pressure to cause the matrix material to flow and occupy any void spaces. In the above cases, it is possible that the matrix can be caused to stick or flow without completely melting. In general, if the matrix material is caused to melt, relatively little pressure is required to form the composite; while if the matrix material is only heated to a sticking point, generally more pressure is required. Also, the pressure and time to set the composite and to achieve optimal properties will generally depend on the nature of the matrix material (chemical composition as well as molecular weight) and processing temperature.

The applicants have found that the construction of the prepreg layer of the present invention results in a layer having unidirectional short fibers of from 1 to 8 and preferably 2 to 6 inches in length. When these fibers are used to form a multilayer composite of at least 2, and preferably from 2 to about 500, and more preferably 10 to 120, and most preferably 60 to 120 layers they have unexpectedly improved ballistic impact resistance. An advantage has been found where the boundaries of the elements within each layer are offset from boundaries in alternate layers so as to not have a flaw or weak point through at least two layers.

The prepreg layers of the present invention typically contain from 5 to 30 fiber ends per inch and preferably 10 to 20 per inch. Each layer is typically from 0.0001 to 0.015, preferably 0.0005 to 0.01, more preferably 0.0005 to 0.005 and most preferably 0.0005 to 0.0025 inches thick. Layers having these dimensions are particularly useful when made of extended chain polyethylene having a yarn of about 1200 denier/118 filament. The areal density is used to indicate the amount of fiber and/or resin per unit area of the prepreg layer. It is determined by the number of yarn strands laid per unit width of prepreg sheet and the amount of resin applied to the yarn. Typically if a 1200 denier/118 filament yarn is laid by 15 ends per inch the yarn aerial density in the prepreg sheet would be about 79 grams per square meter.

An alternate embodiment the present invention includes square woven fabric. The fabric is woven so that the filler and warp fibers are at about 90° from each other. The woven fabric can be impregnated with matrix resin and formed into the composite of the present invention. The fibers are from up to eight inches, preferably one to eight inches and more proferably two to eight inches long. The weave can vary as desired but is typically at 10 to 40 preferably 10 to 20 ends per inch for 1200 denier extended chain polyethylene. The present invention includes a multilayer composite comprising a plurality of prepreg layers where each prepreg layer comprises an array of at least two adjacent coplanar fibrous elements. Each element comprises a plurality of square wove fibers embedded in a polymeric matrix in an analogous way as a the unidirectional fiber prepreg layers recited above. The fibers in the filler and warp direction of adjacent layers are respectively parallel.

The composites made can be molded in flat or three dimensional presses, stamped or molded in an autoclave. The main variables are pressure, time and temperature. Flat plaques can be molded between two plates of a molded press. The plates are heated to a controlled temperature. A molding press which has been used has a plate size of 2 feet by 2 feet and a molding pressure of up to 200 tons.

The following examples are presented to provide a more complete understanding of the invention, the specific techniques, conditions, materials, proportions and reported data set forth to illustrate the principles of the invention are exemplary and should not be construed as to limiting the scope of the invention.

EXAMPLES

Figure 7:
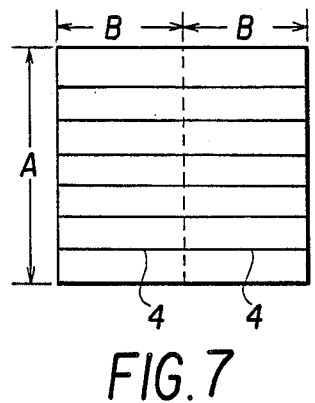
FIG. 7 is a schematic drawing of a prepreg layer of the type used in the Examples.

The following examples are of multilayer composites made of plaques of 12 by 12 inches. The plaques were prepared by forming prepreg layers using fibrous elements of the type shown in FIG. 4. Individual plaques in the various Comparatives and Examples were made based on elements having fiber with lengths of 2, 4, 6 and 12 inches in the 12 by 12 inch plaques. Comparative 2 was made with an 18×18 plaque. Where the fiber dimension is less than 12 by 12 it is cut to a length perpendicular to the direction of the fibers so that for example, a fiber having a 6 inch length (dimension B) is shown in FIG. 7. Additional layers were laid-up with fiber direction in alternate layers perpendicular. Similarly, where the fiber length is 4 inches (dimension B), the 12 inch prepreg sheets are cut at each 4 inch length perpendicular to the length of the fiber. When dimension B was 2 or 3 inches, the prepreg sheets were cut 2 or 3 inches perpendicular to the fiber. Fibers in adjacent layers are perpendicular to each other (0°/90°/0°/90° etc.).

Each layer was laid up on top of each other in the mold. The composite was formed from the layers at the temperatures and times indicated. The press used was a platen press having 18 inch by 18 inch platens and a 200 ton pressure capacity. Specific composite structures made are reviewed below.

The ballistic composites were tested using a .22 caliber, non-deforming steel fragment of specified weight, hardness and dimensions (MIL-SPEC. MIL-P-46593 A (ORD)). The shots were aimed at the center of each element layup, (i.e., the center of each 6×6 inch section of the composite). The ballistic protective capacity of a structure is normally expressed by citing the impacting velocity at which 50% of the projectiles are stopped, and is designated the $V_{50}$ value.

The areal density (AD) corresponds to the weight of fiber per unit area of a structure. In the case of fiber reinforced composites, the ballistic resistance depends mostly on the fiber. A useful weight characteristic is total areal density (ADT) of composites which is the weight of the total composite per unit area of structure.

To compare structures having different $V_{50}$ values and different aeal densities, the examples present the ratios of (a) the kinetic energy (Joules) of the projectile at the $V_{50}$ velocity, to (b) the areal density (AD) of the fiber or of the composite (ADT) (kilograms per meter square). These ratios are designated as the Specific Energy Absorption based on the fiber areal density (SEA) and specific energy absorption of the total composite (SEAT), respectively.

Examples 1-5 and Comparative 1 are representative examples of the composite of the present invention made using 12×12 inch plaques and Comparative 2 used a 18×18 inch plaque. In these examples the fiber used was Spectra® 900 extended chain polyethylene fiber produced by Allied Corporation. The following are typical properties of this fiber. This fiber is yarn which has a tenacity of approximately 29.5 grams/denier, a modulus of approximately 1250 grams/denier, an energy to break of approximately 55 joules/gram, a yarn denier of approximately 1200 and an individual filament denier of approximately 10 (118 filaments, untwisted yarn). The prepregs were made using yarn which was made at approximately 15 ends per inch. The yarn was pulled from creels and coated with the indicated polymer. The polymer used was Airflex® 105, ethylene vinyl acetate copolymer (EVA). This material is sold by the Air Products Corporation and is described as being an emulsion having a Brookfield viscosity measured on a Brookfield Viscometer, Model LVF at 60 rpm of from 400 to 600, 52% solids, a pH of 5.0 to 6.0, a Tg of 0° C. using an anionic emulsifier. Several of the examples used a thermosetting epoxy matrix. The epoxy used was EPON® 828 sold by Shell Chemical Co and described in the, Technical Bulletin, Shell Chemical Company, EPON® 828, SC: 235-81.828. This material is described as having a viscosity of 110 to 150 poise at 25° C., a maximum Gardner Color of 3 and epoxide equivalent weight of 185-192. The curing agent used was diethylenetriamine at 5.2 pHR.

Table 1 summarizes the construction and ballistic impact results for various plaques evaluated.

TABLE 1

| Example | Matrix | Fiber length inch | Fiber AD kg/m$^2$ | Fiber content % | V50 ft/sec | SEA J. m$^2$/kg |
|---|---|---|---|---|---|---|
| Comp 1 | EVA | 12 | 4.46 | 73 | 1840 | 38.8 |
| Ex. 1 | EVA | 6 | 4.51 | 74 | 2036 | 47.0 |
| Ex. 2 | EVA | 6 | 4.50 | 65 | 1883 | 40.3 |
| Ex. 3 | EVA | 4 | 4.49 | 65 | 1915 | 41.8 |
| Ex. 4 | EVA | 2 | 4.50 | 68 | 2017 | 46.3 |
| Comp 2 | EVA | 18 | 4.51 | 73.3 | 1849 | 38.8 |
| Comp 3 | Epoxy | 12 | 4.5 | 68 | 1818 | 37.3 |
| Ex. 5 | Epoxy | 3 | 4.5 | 72 | 1871 | 39.8 |

A review of the above results indicates that the $V_{50}$ and SEA measurements are significantly higher for plaques made with fibers having a length of from 2 to 6 inches than for plaques made having a fiber length of 12 or 18 inches.

EXAMPLE 6

The following example illustrates the composite of a woven fabric made of Sepctra® 900 fiber as described above, square woven at 18 by 18 ends per inch. The matrix was Derekane® 8084 made by the Dow Chemical Co. This material is a modified vinyl ester alkyd dissolved in styrene moroner. The alkyd is a condensation product of bisphenol A, methacrylic acid, and carboxyl terminated butadiene-acrylonitrile elastomer. The resin was prepared from a two part system. Part A was a methyl ethyl ketone peroxide sold or Lupersol® DHD9 by Pennwalt Corp. Part B was a cobalt salt solution with 6% by weight elemental cobalt. 200 grams of Derekane 8084 resin plus 6 grams of peroxide (Part A) was mixed with 200 grams of Derekane 8084 resin plus 1.2 grams of the cobalt salt solution. The mixture was made at room temperature and immediately spread onto the fabric layers. 22 layers were stacked and were mold at 60° C. under 27 tons pressure for 3 hours. Targets were 12 inches×12 inches. In Comparative 4 the fiber was continuous, while in Example 6 the layers were made using elemets 3 inches square. Results are summarized in Table 2 below:

TABLE 2

|  | Comp 4 | Ex. 6 |
|---|---|---|
| AD, (kg/m$^2$) | 4.22 | 4.30 |
| ADT, (kg/m$^2$) | 7.12 | 7.48 |
| % Fiber | 59.3 | 57.2 |
| Fabric, (ends/in) × (fils/in) | 18 × 18 | 18 × 18 |
| Yarn Length, (in) | 12 | 3 |
| V50, (ft/sec) | 1466 | 1552 |
| SEA, (Jm$^2$/kg) | 26.1 | 28.7 |
| SEAT (Jm$^2$/kg) | 15.4 | 16.5 |

EXAMPLE 7

Example 7 illustrates the use of fabric with a rigid polyvinylchloride matrix. The fabric was Spectra® 900 14 ends/in by 14 fils/in. The polyvinylchloride was Geon® 351 made by B. F. Goodrich. It has a Tg of 62° C. and is supplied as a latex. 30 layers of fabric were stacked and molded at 118° C., under a pressure of 28 tons, per 30 minutes. Targets were 12 inches by 12 inches. In comparative 5 the fiber was continuous, while in Example 7 the layers were made using elements 4 inches square.

TABLE 3

|  | Comp 5 | Ex. 7 |
|---|---|---|
| AD, (kg/m$^2$) | 4.45 | 4.45 |
| ADT, (kg/m$^2$) | 7.32 | 6.89 |
| % Fiber | 60.8 | 64.5 |
| Fabric, (ends/in) × (fils/in) | 14 × 14 | 14 × 14 |
| Yarn Length (in) | 12 | 4 |
| V50 (ft/sec) | 1688 | 1780 |
| SEA (Jm$^2$/kg) | 32.8 | 36.4 |
| SEAT (Jm$^2$/kg) | 19.9 | 23.5 |

COMPARATIVE 6

Comparative 6 is directed to a multilayer composite made using randomly oriented extended chain polyethylene fibers sold by Allied Corporation as Spectra ® 900 and described above. The fibers were 1 inch long and the matrix used was Kraton D-1107 described as a styrene-isoprene-styrene block copolymer having a Brookfield viscosity of 1200 cps at 77° F. at a 25% concentration in toluene, and a styrene to rubber ratio of 28/72. The plaque made was 10 inches by 10 inches. The sample was made by cutting Spectra ® 900 fabric into 1 inch squares. The individual yarns were freed from the fabric structure to form a randomly oriented mat weighing 300 grams. The mat was covered with a EVA solution containing 100 grams of thermoplastic elastomer in toluene. The solvent was evaporated and the sample was molded into a 10 inch square mold for 30 minutes at 130° C. under 40 tons of force. Results are sumarized in Table 3 below:

TABLE 4

| SAMPLE SIZE | 10 in. × 10 in. |
|---|---|
| MATRIX | Kraton D1107 |
| WT % FIBER | 74.1% |
| AD, (kg/m$^2$) | 4.65 |
| ADT, (kg/m$^2$) | 6.28 |
| V50, (ft/sec) | 1268 |
| SEA, (Jm$^2$/kg) | 17.7 |
| SEAT, (Jm$^2$/kg) | 13.1 |

While examplary embodiments of the invention have been described, the true scope of the invention is to be determined from the following claims.

We claim:

1. A prepreg layer comprising an array of at least two adjacent coplanar fibrous elements, with each element comprising a plurality of unidirectional fibers embedded in a polymeric matrix, the fibers being up to eight inches in length, the adjacent elements connected by the polymer matrix.

2. The prepreg layer as recited in claim 1 wherein the fibers are from one to eight inches long.

3. The prepreg layer as recited in claim 2 wherein the fibers are from about two to about six inches long.

4. The prepreg layer as recited in claim 1 wherein the fibers have a tensile modulus of at least about 160 g/denier and an energy to break of at least 7 J/g.

5. A multilayer composite comprising a plurality of prepreg layers where each prepreg layer comprises an array of at least two adjacent coplanar fibrous elements, with each element comprising a plurality of unidirectional fibers embedded in a polymeric matrix, the fibers being up to eight inches in length and the fibers of adjacent layers being of an angle of about 90° from each other.

6. The composite as recited in claim 5 wherein the fibers of the prepreg layers are from about one to about eight inches long.

7. The composite as recited in claim 6 wherein the fibers of the prepreg layers are from about two to about six inches long.

8. The composite as recited in claim 5 wherein adjacent elements connected along element boundaries by the polymer matrix and the element boundaries of alternate layers being offset from each other.

9. The composite as recited in claim 5 wherein the fibers of the prepreg layers have a tensile modulus of at least about 160 g/denier and an energy to break of at least 7 J/g.

10. The composite as recited in claim 5 wherein there are from 2 to 500 prepreg layers.

11. The composite as recited in claim 10 wherein there are from 10 to 150 layers.

12. An article comprising a multilayer composite comprising a plurality of prepreg layers, where each prepreg layer comprises an array of at least two adjacent fibrous elements, with each element comprising a plurality of unidirectional fibers embedded in a polymeric matrix, the fibers being up to eight inches in length and the fibers of adjacent layers being at an angle of about 90° from each other.

13. The article as recited in claim 12 wherein the fibers of the prepreg layers are from about one to about eight inches long.

14. The article as recited in claim 13 wherein the fibers of the prepreg layers are from about two to about six inches long.

15. The article as recited in claim 12 wherein the adjacent elements connected along element boundaries by the polymer matrix and the element boundaries of alternate layers being offset from each other.

16. The article as recited in claim 12 wherein the fibers of the prepreg layers have a tensile modulus of at least about 500 g/denier and an energy break of at least 22 J/g.

17. The article as recited in claim 12 wherein there are from 2 to 500 prepreg layers.

18. The article as recited in claim 17 wherein there are from 10 to 120 layers.

19. The article as recited in claim 12 wherein the article is planar.

20. The article as recited in claim 12 wherein the article is three dimensional.

21. The article as recited in claim 2 wherein the article is a helmet.

22. A multilayer composite comprising a plurality of prepreg layers where each prepreg layer comprises an array of at least two adjacent coplanar fibrous elements, with each element comprising a plurality of square woven fibers embedded in a polymeric matrix, the fibers being up to eight inches in length.

23. The composite as recited in claim 22 wherein the fibers of the prepreg layers are from about one to about eight inches long.

24. The composite as claimed in claim 22 wherein the fibers of the prepreg layers have a tensile modulus of at least about 160 g/denier and an energy to break of at least 7 J/g.

* * * * *